H. ST. PIERRE.
ANTISKID DEVICE.
APPLICATION FILED SEPT. 24, 1919.
1,363,994.
Patented Dec. 28, 1920.
2 SHEETS—SHEET 1.
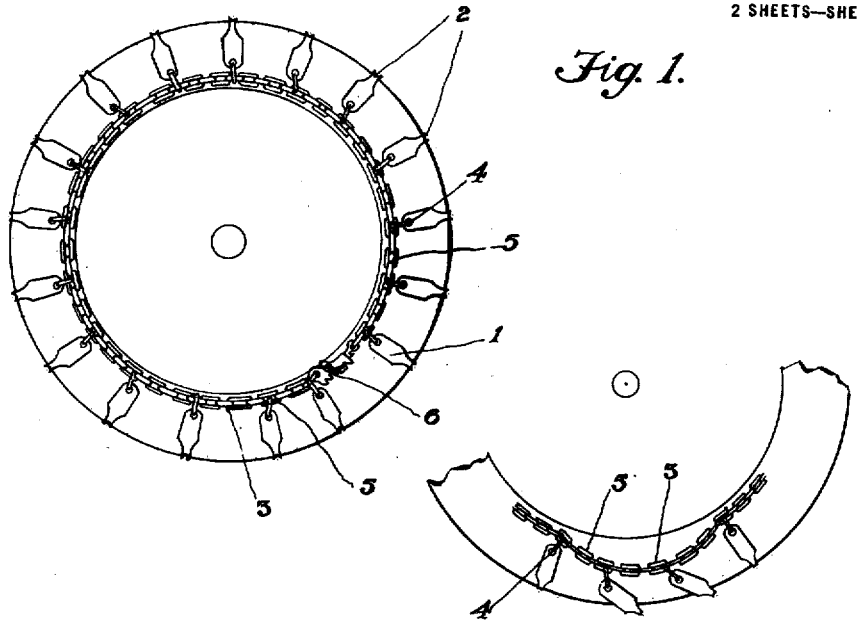
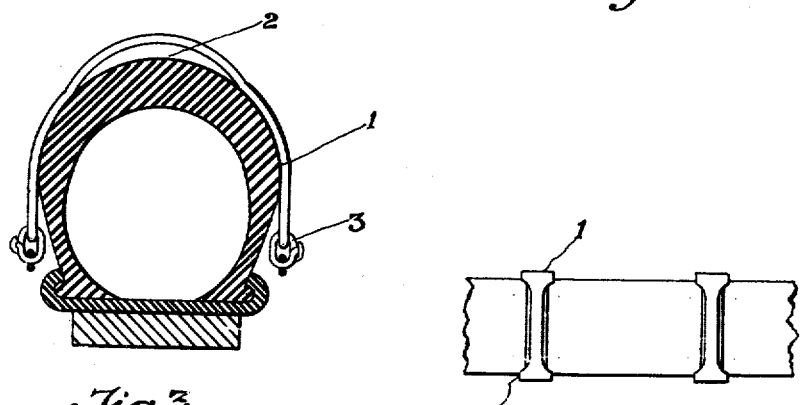
Inventor
Henry Saint Pierre
By Victor J. Evans
Attorney

H. ST. PIERRE.
ANTISKID DEVICE.
APPLICATION FILED SEPT. 24, 1919.

1,363,994.

Patented Dec. 28, 1920.
2 SHEETS—SHEET 2.

Inventor
Henry Saint Pierre.

By Victor J. Evans
Attorney

UNITED STATES PATENT OFFICE.

HENRY ST. PIERRE, OF WILLIAMSTOWN, VERMONT.

ANTISKID DEVICE.

1,363,994.  Specification of Letters Patent.  Patented Dec. 28, 1920.

Application filed September 24, 1919. Serial No. 325,983.

*To all whom it may concern:*

Be it known that I, HENRY ST. PIERRE, a citizen of the United States, residing at Williamstown, in the county of Orange and State of Vermont, have invented new and useful Improvements in Antiskid Devices, of which the following is a specification.

This invention relates to an anti-skid device for automobile tires, and has for its primary object to provide a device in which the tread members are so associated that movement of the device on the tires will be absolutely prevented, and besides increase the gripping action between the device and the ground, created upon the tendency of the tires to skid.

An object of the invention is to provide means for quickly clamping the device in place upon the tires, and capable of taking up all slack in the device when in an applied position.

With these and other objects in view the invention will be better understood from the following detailed description taken in connection with the accompanying drawings, wherein:

Figure 1 is a side elevation of an automobile wheel with my invention applied thereto.

Fig. 2 is a similar view with two of the tread members in the position they assume when the tire tends to skid.

Fig. 3 is a cross section view through the tire.

Fig. 4 is an edge view of a portion of the device.

Figure 5:
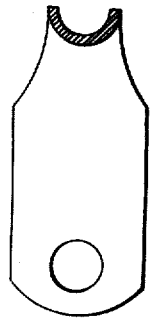
Fig. 5 is a cross section view of one of the members.
Figure 6:
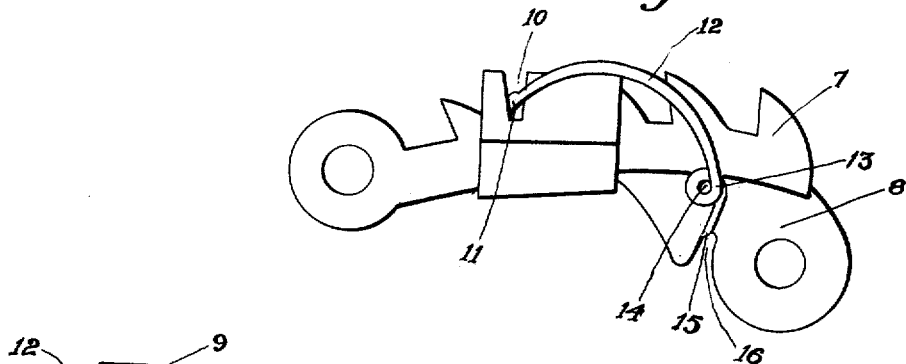
Fig. 6 is an enlarged side elevation of the clamp.
Figure 7:
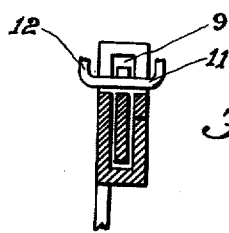
Fig. 7 is a cross section view thereof.
Figure 8:
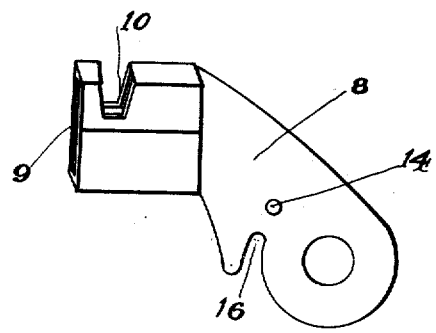
Fig. 8 is a perspective view of the clip.

Again referring to the drawings illustrating the preferred one of the many forms in which the invention may be constructed a numeral 1 designates a plurality of tread members arcuate shape so as to conform to the tread of the tire. The intermediate portion of each member is provided with radially extending flanges 2 for engagement with the ground. Links 3 flexibly connect openings 4 in the members with chains 5.

By this arrangement as clearly shown in Fig. 2 of the drawings, the gripping effect between the members and the ground will be materially increased when the tire tends to skid, owing to the fact that the frictional engagement of the flanges with the ground will force the members in a direction to bring a greater portion of each member into engagement with the ground. It will also be noted that a portion of each chain 5 is forced out of its normal position which materially increases the pressure between the upper members and the tire thereby absolutely preventing slipping of the device on the tire.

A feature of my invention is the clamp 6 which enables me to quickly arrange the device in place and take up any slackness in the chain. This clamp consists of a ratchet element 7 pivotally connected to one end of the chain and the clip 8 pivotally connected to the other end of the chain. The clip 8 is provided with a guide way 9 for the reception of the element 7 and a slot 10 arranged so as to allow the free end 11 of the spring 12 to enter the slot 10 and engage anyone of the teeth of the ratchet element. The spring has an intermediate portion 13 pivoted to a rivet 14 in the clip while its remaining end 15 is arranged in recess 16 in the clip, so that the clip may have the proper degree of resiliency in its engagement with the teeth.

It is of course to be understood that the invention may be constructed in various other manners and the parts associated in other relations, and therefore I do not desire to be limited in any manner except as set forth in the claim hereunto appended.

What I claim is:—

A chain fastener comprising a loop-like guide member carried by one end of a chain, a ratchet member carried by the other end of the chain and slidable through said guide and formed with a plurality of notches, a U-shaped spring secured upon said guide and having its bight portion engageable within a selected one of said notches and said guide having a slot for the reception of the bight portion of the spring.

In testimony whereof I affix my signature.

HENRY ST. PIERRE.